3,308,209
METHOD AND APPARATUS FOR PREPARATION OF PHOSPHORIC ACID ESTER POLYOLS
Stephen E. Freeman, Mequon, Wis., assignor to Freeman Chemical Corporation, Port Washington, Wis., a corporation of Delaware
Filed Mar. 15, 1965, Ser. No. 439,683
2 Claims. (Cl. 260—978)

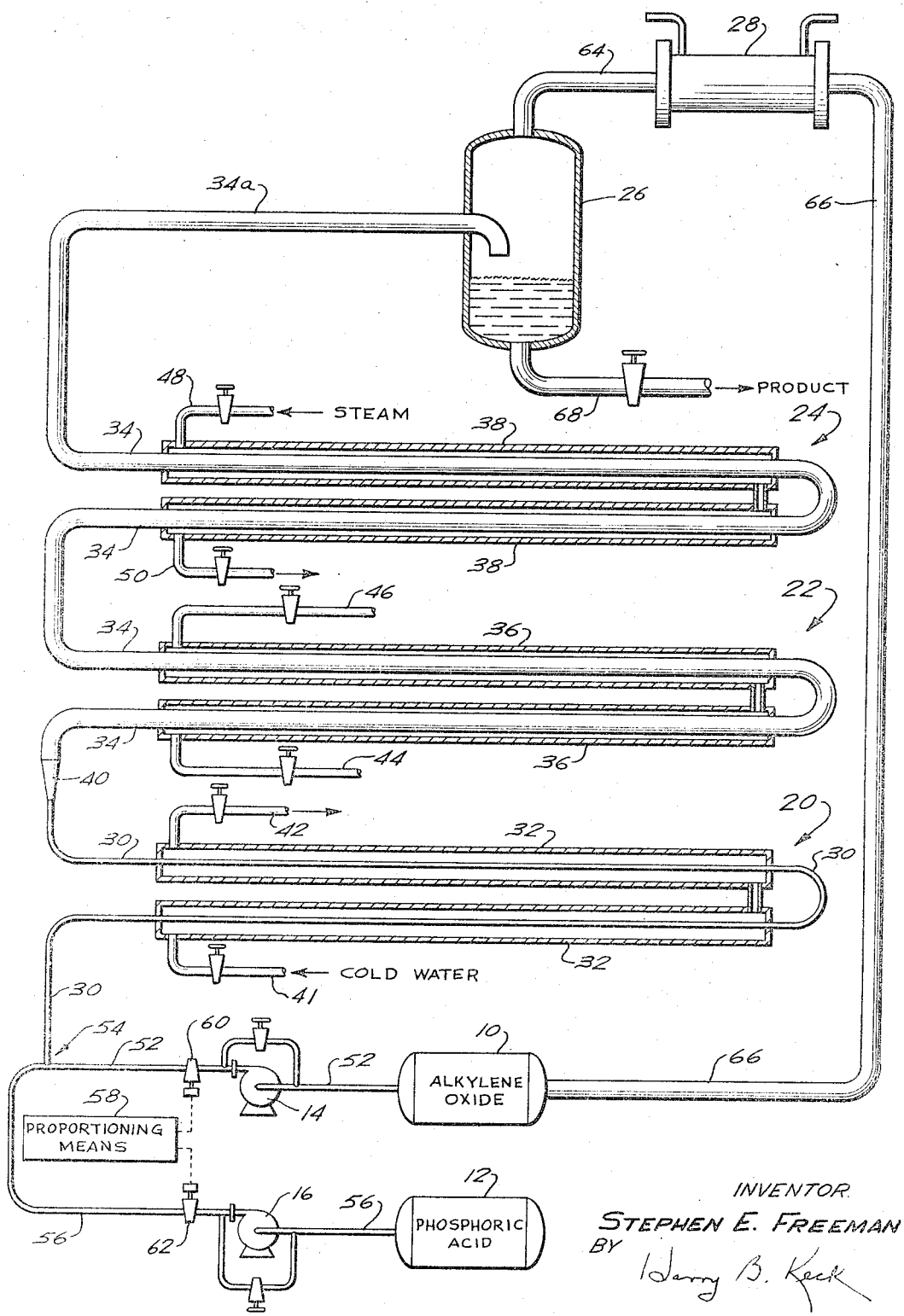

This invention relates to a method and apparatus for preparing phosphoric acid ester polyols.

Phosphoric acid combines readily with alkylene oxides to yield phosphoric acid ester polyols. The phosphoric acid reactant should be essentially free of uncombined water and essentially free of higher forms of phosphoric acids. That is, the phosphoric acid should comprise essentially $H_3PO_4$. Useful alkylene oxides are ethylene oxide, propylene oxide, butylene oxide, epichlorohydrin, and epibromohydrin. The general reactions are shown in French Patent 1,298,363. The resulting polyols are useful as starting materials in the preparation of polyurethane polymers.

According to this invention, a stream of phospheric acid and a stream of alkylene oxide are blended in proper proportions and delivered through an elongated reaction zone, such as a first pipe, under turbulent flow conditions while the exothermic heat of reaction is extracted through the walls of the reaction zone. Subsequently the reaction mixture is delivered through a second elongated reaction zone, such as a second pipe, under non-turbulent conditions to assure completion of the desired reaction. Preferably extrinsic heat is added to the second reaction zone to assume completion of the reaction. Since an excess of the alkylene oxide is provided, the resulting stream emanating from the second reaction zone will contain the desired polyols and some unreacted alkylene oxide. The unreacted alkylene oxide is recovered by flash vaporization and recycled through the process. The liquid polyol product may be utilized directly without further treatment.

The present invention, its objects and advantages, will become apparent from the following detailed description with reference to the accompanying drawing which is a schematic flow diagram illustrating the present apparatus which may be utilized in the practice of the present process.

The present apparatus includes:
A storage tank 10 for alkylene oxide;
A storage tank 12 for phosphoric acid;
A pump 14 for alkylene oxide;
A pump 16 for phosphoric acid;
Three jacketed pipe reactors 20, 22, 24;
A flash vaporization chamber 26; and
A condenser 28.

A first pipe 30 runs through the first pipe reactor 20 within a jacketing pipe 32.

A second pipe 34 runs through the second pipe reactor 22 within a jacketing pipe 36 and through the third pipe reactor 24 within a jacketing pipe 38. The first pipe 30 has a substantially lesser internal diameter than the second pipe 34. The two pipes 30, 34, are connected end-to-end in flow communicating relation by means of a nipple 40. A cooling medium such as cold water may be introduced into the jacketing pipe 32 of the first pipe reactor 20 through a conduit 41 and withdrawn through a conduit 42. Inlet and outlet conduits 44, 46 are provided for the jacketing pipe 36 of the pipe reactor 22 for heating or cooling medium as desired.

A steam inlet conduit 48 and condensate withdrawal conduit 50 are provided for the jacketing pipe 38 of the pipe reactor 24.

*Operation*

Liquid alkylene oxide from the alkylene oxide tank 10 is pumped through an alkylene oxide conduit 52 toward a mixing T 54 at the juncture of the first pipe 30. Phosphoric acid from the phosphoric acid tank 12 is pumped through a conduit 56 to the mixing T 54. A suitable proportioning flow regulator 58 is provided to control the valves 60, 62 of the reactant delivery conduits 52, 56 respectively. The flow rates are adjusted to provide a slight stoichiometric excess of the alkylene oxide.

From the mixing T 54 the mixture of alkylene oxide and phosphoric acid is delivered under turbulent flow conditions via the first pipe 30 which constitutes the first reaction zone through the first pipe reactor 20. Because the reaction between the alkylene oxide and the phosphoric acid is exothermic, it is preferred to remove heat through the walls of the first pipe 30 while a cooling medium such as cold water circulates through the pipe jacketing 32. With the cold water entering through the conduit 41, it will be seen that the heat exchange follows co-current patterns. Because of the intense reactivity between the two reactants, the co-current pattern of heat exchange in the first pipe reactor 20 provides maximum heat dispersion in the region of maximum heat generation.

The turbulent flow of fluids emanating from the first pipe reactor 20 through the first pipe 30 pass through the expansion nipple 40 into the second pipe 34 which has a significantly greater internal diameter than the first pipe 30 to provide non-turbulent flow of the liquid contents. Because the reactants have retained much of the exothermic heat of reaction, the continuation of the reaction will be self-sustaining as the reaction mixture passes through the second pipe reactor 22. The jacketing pipe 36 of the second pipe reactor 22 is adapted to receive a heating medium or a cooling medium as desired. It has been found that neither heating nor cooling is desirable in the second pipe reactor 22 where the alkylene oxide is propylene oxide.

The liquid reaction mixture emanating from the second pipe reactor 22 is introduced directly into the third pipe reactor 24 which is preferably maintained at a desirable temperature by means of steam circulating in the jacketing pipe 38. While the mixture traverses the third pipe reactor 24, the etherification of the phosphoric acid is carried to essential completion as a result of the presence of excess alkylene oxide. The etherification is not only self-catalyzing but also self-terminating. That is, the phosphoric acid itself serves as a catalyst for the etherification reaction between alkylene acid and phosphoric acid. As the etherification proceeds to substantial completion, all of the phosphoric acid is converted to the ester polyols with the result that there is no residual phosphoric acid available for any significant amount of etherification. When the two reactants are thus combined, the product phosphoric acid ester polyols includes about 3.5 mols of the alkylene oxide for each mol of phosphoric acid. About 3 to 10 mols of the alkylene oxide are provided for each mol of phosphoric acid.

The liquid reaction mixture emanating from the third pipe reactor 34 is delivered through a conduit 34a to the flash vaporization chamber 26 wherein the warm alkylene oxide vapors are allowed to escape overhead through a vapor conduit 64. The alkylene oxide vapors from the conduit 64 are condensed in the condenser 28 and returned through an alkylene oxide recycle conduit 66 to the alkylene oxide tank 10 for reintroduction into the reaction apparatus.

The liquid product from the flash vaporization chamber 26 is recovered through a product recovery conduit 68 for use as phosphoric acid ester polyol without further treatment.

*Example*

In a specific example of the present apparatus, the first pipe 30 is fabricated from ¼-inch I.D. stainless steel. The second pipe 34 is fabricated from 3-inch I.D. stainless steel tubing.

The jacketing pipes 32, 36, 38 are fabricated from 6½-inch diameter carbon steel pipe. The flash vaporization chamber 26 has an internal diameter of 12¾ inch and a height of 4 feet. The vapor conduit 64 has a diameter of 3-inches. The product conduit 68 has an inner diameter of 2 inches.

In a typical production run using propylene oxide and phosphoric acid, the propylene oxide is introduced at a rate of about 264 gallons over an 8-hour period while the phosphoric acid is introduced at a rate of about 40-gallons over an 8-hour period. The flow rate of the liquid contents through the first pipe 30 is about 4 feet per second. The flow rate of the liquid contents of the second pipe is about 1.6 feet per minute.

As shown in the drawing, each of the six jacketing pipes 32, 32, 36, 36, 38, 38, has a length of about six feet. Hence the first pipe 30, has a total length of about 15 feet and the second pipe 34 has a total length of about 35 feet.

The product polyol recovered from the pipe 68 is useful directly in the preparation of polyurethane foam products and of prepolymers for polyurethane products.

I claim:

1. Apparatus for the continuous production of phosphorous ester polyols from essentially anhydrous phosphoric acid and alkylene oxide selected from the class consisting of ethylene oxide, propylene oxide, butylene oxide, epichlorohydrin and epibromohydrin comprising:
    (a) a first pipe and a second pipe connected end-to-end as a reaction zone;
    (b) means for removing heat from said first pipe and means for adding heat to said second pipe;
    (c) an expansion chamber for separating liquids and vapors;
    (d) said second pipe being connected at its free end to the said expansion chamber;
    (e) a vapor recovery pipe connected to said expansion chamber and cooling means for condensing vapors in said vapor recovery pipe;
    (f) a liquid recovery pipe connected to said expansion chamber for recovery of said phosphorus ester polyols;
    (g) first pump means for introducing said essentially anhydrous phosphoric acid into the free end of said first pipe;
    (h) second pump means for introducing said alkylene oxide into the free end of said first pipe;
    (i) proportioning means for controlling the flow rate of said first and second pump means.

2. A continuous process for preparing phosphorus ester polyols as a reaction product of essentially anhydrous phosphoric acid and alkylene oxide selected from the class consisting of ethylene oxide, propylene oxide, butylene oxide, epichlorohydrin and epibromohydrin comprising:
    (a) continuously introducing essentially anhydrous phosphoric acid alkylene oxide as a mixture into a first reaction zone under turbulent flow conditions, the alkylene oxide being provided in an amount from 3–10 mols for every mol of the phosphoric acid;
    (b) passing the said mixture through the said first reaction zone under turbulent flow conditions while the said alkylene oxide and the said phosphoric acid react to form phosphoric acid ester polyols;
    (c) withdrawing exothermic heat of reaction through the walls of the said first reaction zone;
    (d) passing the effluent fluids from the first reaction zone through a second reaction zone under non-turbulent flow conditions;
    (e) heating the said second reaction zone to assure substantially complete esterification of the said phosphoric acid;
    (f) recovering the effluent from said second reaction zone and separating the product phosphorus ester polyols from unreacted alkylene oxide vapors; and
    (g) condensing the said alkylene oxide vapors and recovering the liquefied alkylene oxide for recycle through the process.

No references cited.

MORRIS O. WOLK, *Primary Examiner.*

J. H. TAYMAN, *Assistant Examiner.*